United States Patent
Lee et al.

(10) Patent No.: US 6,480,248 B1
(45) Date of Patent: Nov. 12, 2002

(54) METHOD OF ILLUMINATING LIQUID CRYSTAL LAYER AND LIQUID CRYSTAL DISPLAY DEVICE USING THE SAME

(75) Inventors: Jeong-Hwan Lee; Kyu-Seok Kim, both of Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/022,029

(22) Filed: Dec. 14, 2001

(30) Foreign Application Priority Data

Jul. 12, 2001 (KR) .......................................... 2001-41942

(51) Int. Cl.$^7$ ............................................ G02F 1/1335
(52) U.S. Cl. ............................ 349/96; 349/103; 349/65
(58) Field of Search .............................. 349/96, 103, 65

(56) References Cited

U.S. PATENT DOCUMENTS 6,384,881 B1 * 5/2002 Arai et al. ...................... 349/65

* cited by examiner

*Primary Examiner*—James Dudek
(74) *Attorney, Agent, or Firm*—Cantor Colburn LLP

(57) ABSTRACT

Disclosed are an LCD and a method of illuminating a liquid crystal layer. A protecting sheet is disposed on a reflection polarization film for enhancing the brightness. The protecting sheet is made of polyethylene terephthalate based material manufactured by an extension process to enhance the brightness, to improve visual angle and to prevent a Moire phenomenon. The LCD and the illumination method of the present invention enable high brightness displaying, color modulation depending on the visual angle and a relatively low manufacturing cost.

19 Claims, 5 Drawing Sheets

METHOD OF ILLUMINATING LIQUID CRYSTAL LAYER AND LIQUID CRYSTAL DISPLAY DEVICE USING THE SAME

BACKGROUND OF THE INVENTION

1. Field of the Invention

The present invention relates to a method of illuminating a liquid crystal layer and a liquid crystal display (hereinafter, LCD) using the same, and more particularly, to a method of illuminating a liquid crystal utilized in an LCD and capable of decreasing manufacturing costs as well as enhancing both brightness characteristics depending on visual angles and whole brightness characteristics, and an LCD using the illuminating method.

2. Description of the Related Art

Generally, an LCD is defined as one of flat panel displays which display data processed in an information processing device as characters, images and moving pictures using an optical property of liquid crystal in which light transmittance is varied depending on an intensity of an applied electric field.

Liquid crystal in an LCD controls transmittance of an incident light wave or beam depending on the intensity of an applied electric field to allow an image to be displayed. This means that all LCDs using such a liquid crystal require a light for displaying an image.

Such light is provided by an electrical energy internally charged in the LCD itself or from an external light source.

Where internally charged electrical energy is used in an LCD as a light source, an image can be displayed without being effected by an external environment of the LCD, such as existence or nonexistence of an external light source or intensity of light.

In the meantime, where the external light source is used for supplying light to an LCD, an image can be displayed with very small power consumption but the display is greatly affected by an external environment. For example, the display is not possible where there is no externally available light, or the quality of the display is greatly degraded where the intensity of an existing external light is insufficient.

Therefore, an LCD utilizing internally charged electrical energy for providing light to a liquid crystal layer, herein referred to as a "transmission type LCD", has been widely used.

The transmission type LCD generally includes an LCD panel for controlling a liquid crystal and various elements for effectively using light which is supplied to the LCD panel after being generated from a lamp.

Specifically, as shown in FIG. 1, a conventional transmission type LCD 80 includes an LCD panel 20 and a backlight assembly 40.

The LCD panel 20 includes a TFT substrate 16 having a selected effective display area, a color filter substrate facing the TFT substrate 16, a liquid crystal layer (not shown) interposed between the TFT substrate 16 and the color filter substrate 14, a lower polarizing plate 18 attached to an outer surface of the TFT substrate 16 and an upper polarizing plate 12 attached to an outer surface of the color filter substrate 14.

The LCD panel 20 requires an incident light having an optical distribution of a planar light source and a uniform brightness in order to display an image with a uniform quality throughout the entire area of the effective display area.

However, since an optical distribution of a planar light source is difficult to obtain as an incident light, the backlight assembly 40 is used in the LCD 80.

The backlight assembly 40 includes a lamp assembly, a light guiding plate 35, a reflection plate 38, a diffusion plate 34, a prism sheet 33, a reflection polarization film 32, and a reflection polarization film protection sheet 31.

The lamp assembly includes a CCFT (Cold cathode fluorescent tube) type lamp 37 for generating a white light that is similar to natural light and having a long life time and an easy manufacturing characteristic, and a lamp reflector 36 for directing the white light toward one direction.

Since the CCFT type lamp 37 generates light having an optical distribution of a linear light source, a member is required to transform the generated light into light having an optical distribution of a planar light source.

Specifically, in order to transform the light generated by the CCFT type lamp 37 having the optical distribution of the linear type into the light having the optical distribution of the planar type, the light guiding plate 35 is used.

The light guiding plate 35 has a plate-shaped parallelepiped structure. An incident light having the optical distribution of the linear light source is uniformly reflected throughout the entire area of the light guiding plate 35, and the optical distribution of the planar light source is thus obtained.

The light illuminated from the light guiding plate 35 has the optical distribution of the planar light source but it has a low uniformity of brightness. Therefore, it is difficult to display an image having a high quality using the light guiding plate 35 alone.

To overcome this drawback, the diffusion plate 34 for diffusing the light illuminated from the light guiding plate 35 is provided on the light guiding plate 35.

The light outputted from the diffusion plate 34 has an improved optical uniformity, however the light has an irregular progressive direction. Thus, a visual angle at the front side is significantly decreased.

To improve the visual angle at the front side, one sheet or two sheets of prism sheet 33 is disposed on the diffusion plate 34.

The light passes through the CCFT type lamp 37, the light guiding plate 35, the diffusion plate 34, the prism sheet 33, the lower polarizing plate 18, the TFT substrate 16, the liquid crystal layer, the color filter substrate 14, and the upper polarizing plate 12 to display an image.

The light that generated from the CCFT type lamp 37 has two kinds of wave forms, i.e., a P wave and an S wave. The P wave light passes through the lower polarizing plate 18 but the S wave light does not pass through the lower polarizing plate 18 and is dissipated.

Here, the P wave and the S wave are classified depending on the polarizing axis which the waves pass through. Particularly, the light that passes through the lower polarizing plate 18 is defined as the P wave and the light that does not pass through the lower polarizing plate 18 is defined as the S wave. This means that only 50% of the light output from the CCFT type lamp 37 arrives at a user's eye.

To improve the low light efficiency, the reflection polarization film 32 is disposed on the prism sheet 33. The reflection polarization film 32 passes the P wave but it reflects the S wave and converts the reflected S wave into the P wave.

The reflection polarization film 32 is easily contaminated or scratched due to foreign particles and is susceptible to a Moire phenomenon due to a relationship between the prism sheet and a pattern of the TFT substrate. Also, the reflection polarization film 32 has a non-uniform visual angle.

In order to prevent these problems, the protection sheet 31 is disposed on the reflection polarization film 32.

The protection sheet 31 is usually made of a polycarbonate (PC)-based material, which is manufactured by an extrusion process into a form of a thin sheet. The protection sheet 31 has a vague polarizing axis as shown in FIG. 2. Therefore, the protection sheet 31 prevents a lowering of the brightness even if an angle between a polarizing axis of the reflection polarization film 32 and a polarizing axis of the protection sheet 31 is not adjusted, and it also remedies disadvantages of the reflection polarization film 32.

Although the protection sheet 31 made of the PC-based synthetic resin guarantees a certain level of brightness regardless of the polarizing axis, the film experiences a deformation such as a wrinkling and shrinkage due to a considerably high thermal expansion coefficient and increases the manufacturing cost of the LCD due to a high cost of the extrusion process.

SUMMARY OF THE INVENTION

Accordingly, in one aspect of the present invention, there is provided a method for illuminating a liquid crystal layer, which allows an image display with a high brightness while reducing overall manufacturing costs.

In another aspect, there is provided an LCD, which displays an image with a high brightness while reducing overall manufacturing costs.

According to the method for illuminating a liquid crystal layer, a light including a first light passing through a first polarizing axis and a second light passing through a second polarizing axis is generated. The optical properties of the first and second lights are changed, if required. More specifically, the polarization of the second light is changed such that the second light passes through the first polarizing axis, thereby enhancing brightness of light to be utilized for illuminating the liquid crystal layer. The first light and the changed second light are passed through a third polarizing axis which allows a brightness pattern repeated in a range of a first value and a second value depending on an angle between the third polarizing axis and the first polarizing axis, the first value being greater than the second value. The angle between the third polarizing axis and the first polarizing axis is controlled such that the first light and the changed second light are transmitted as a third light having a brightness of a desired value. The desired value is equal to or greater than the second value and equal to or less than the first value. The third light is provided to a liquid crystal layer.

In another aspect of the present invention, an LCD includes a light source generating a light including a first light passing through a first polarizing axis and a second light passing through a second polarizing axis. An optical distribution changing means changes the optical properties of the first and second lights. A reflection polarization film having the first polarizing axis through which the first light passes, changes the polarization of the second light into that of the first light so that the changed second light passes the reflection polarization film. A protection sheet is disposed on the reflection polarization film. The protection sheet has a third polarizing axis, and passes therethrough the first light and the changed second light to have a brightness pattern repeated in a range of a first value and a second value depending on an angle between the third polarizing axis and the first polarizing axis, the first value being greater than the second value. The angle is adjusted such that the first light and the changed second light are transmitted as a third light having a brightness of a desired value equal to or greater than the second value and equal to or less than the first value. An LCD panel receives the third light and then displays an image.

According to the present invention, the protection sheet is manufactured by an extension process of PET-based material and disposed on the reflection polarization film used for enhancing the display brightness. The protection sheet of the present invention can be manufactured at a low price compared with the conventional protection sheet manufactured by an extrusion process of PC-based material. Also, since the protection sheet of the present invention has a relatively low thermal expansion coefficient compared with that of the conventional protection sheet, deformation of the protection sheet is prevented, color variation depending on variation of the visual angle is minimized, etc.

BRIEF DESCRIPTION OF THE DRAWINGS

The above objects and other advantages of the present invention will become more apparently by describing in detail the preferred embodiments thereof with reference to the accompanying drawings, in which.

DETAILED DESCRIPTION OF THE PREFERRED EMBODIMENTS

Now there is described a method of illuminating an liquid crystal layer in accordance with one exemplary embodiment of the present invention with reference to the accompanying drawings.

Figure 3:
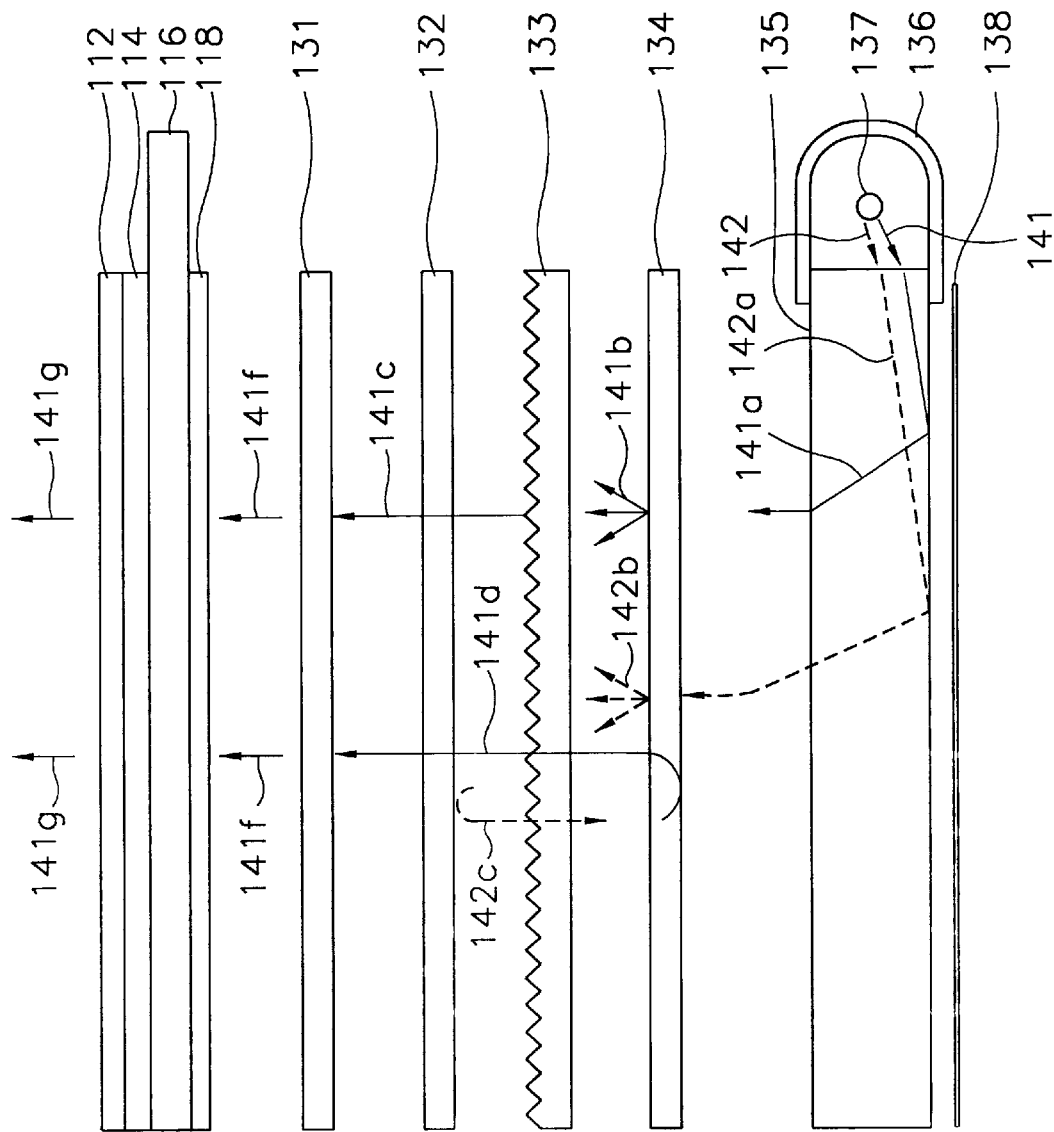
FIG. 3 is a schematic view of an LCD in accordance with one preferred embodiment of the present invention.

Referring to FIG. 3, a light for image displaying includes a P wave 141 and an S wave 142. Here, P wave is defined as a first light that passes through a first polarizing axis and S wave 142 is defined as a second light that does not pass through the first polarizing axis but passes through a second polarizing axis.

Light necessary for displaying an image should be uniformly illuminated throughout the entire display area of an LCD, for producing desirable displaying quality. To this end, several steps for improving optical properties of the light are performed.

Where the light has an optical distribution of a linear light source, the linear light of the P wave 141 and S wave 142 is transformed into a planar light 141a, 142a.

After that, if the obtained planar light 141a, 142a has a non-uniform brightness distribution, the planar light 141a, 142a having the non-uniform brightness distribution is changed into a planar light 141b, 142b having a uniform brightness distribution.

Thereafter, where the planar light 141b, 142b is has a desirable visual angle, the planar light 141b, 142b is changed into a visual angle-enhanced light 141c, 142c having a P wave component light 141c and an S wave component light 142c.

Then, since the P wave component light 141c passes through the first polarizing axis, it can be used for the display, but since the S wave component light 142c does not pass through the first polarizing axis, it cannot be used for the display.

Thus, if the S wave component light 142c cannot be used for the display, a light amount of up to 50% is wasted, so that the displaying brightness is considerably lowered.

In order to prevent the lowering of the brightness, the S wave component light 142c of the visual angle-enhanced light is changed into a P wave component light 141d.

Then, although the changed P wave component light 141d can prevent the lowering of the brightness, the changed P wave component light 141d may cause the lowering of the visual angle and a Moire phenomenon. Thus, it is necessary to enhance the optical properties, without having an adverse effect on the brightness.

To realize this, a third polarizing axis is provided to pass therethrough both of the P wave component lights 141c and 141d.

However, depending on a relationship between the first polarizing axis and the third polarizing axis, there occurs a wide difference in the brightness of the P wave component lights 141c and 141d.

Specifically, an azimuthal angle of the third polarizing axis is controlled such that the P wave component lights 141c and 141d are changed to a light having a desired level of brightness after passing through the third polarizing axis.

Figure 4:
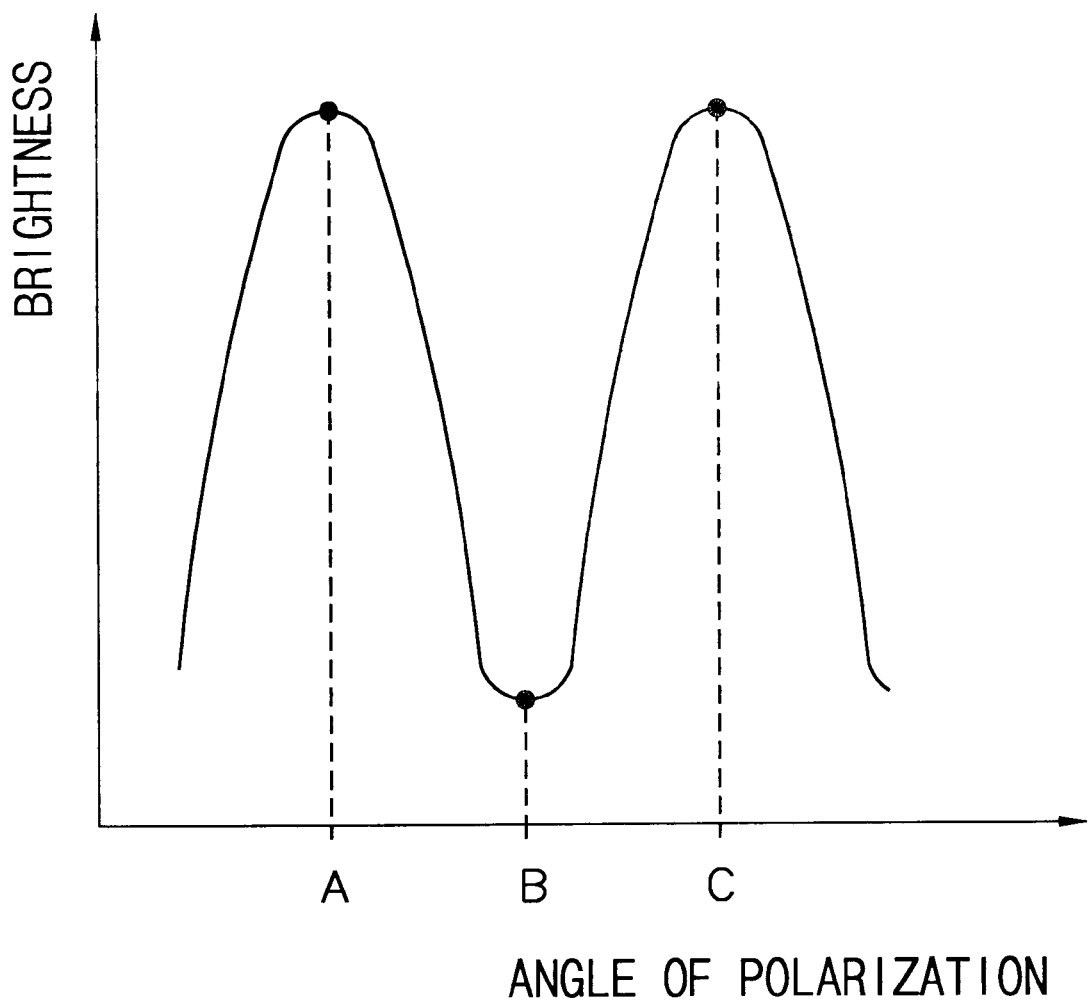
FIG. 4 is a graph showing a relationship between a polarizing axis of a reflection polarization film protection sheet made of polyethylene terephthalate based material and a polarizing axis of the reflection polarization film in the LCD of FIG. 3.

FIG. 4 shows that the brightness of the P wave component lights 141c and 141d varies from a maximum value to a minimum value depending on the azimuthal angle of the third polarizing axis.

Thus, it is very important to control the azimuthal angle of the third polarizing axis since the angle directly affects the brightness of the P wave light components 141c and 141d.

In one embodiment of the present invention, in order to obtain the maximum brightness, it is most preferable to correspond the first polarizing axis to the third polarizing axis.

In another embodiment, it is possible to tilt the third polarizing axis from the first polarizing axis within a certain range. For example, the tilted angle is preferably in the range of less than 10 degrees.

Thereafter, the P wave component lights 141c and 141d pass through the third polarizing axis and are changed into a displaying light 141f. The light 141f passes through a liquid crystal layer and is changed into a light 141g having various colors. The light 141g is continuously incident into a user's eye to allow the user to view an image.

Hereinafter, there is described an LCD capable of realizing the aforementioned light illumination method with reference to the accompanying drawings.

In FIG. 3, a reference numeral 137 indicates a lamp for creating a linear light source and a reference numeral 136 indicates a lamp reflector for concentrating toward one direction a light radially irradiated from the lamp 137.

The light generated from the lamp 137 is directed to the lamp reflector 136 with an optical distribution of a linear light source and is then reflected by the lamp reflector 136. The reflected light is transmitted into a light guiding plate 135 through a side face of the light guiding plate 135. The incident light is also reflected by a lower surface of the light guiding plate 135 and is then changed into a planar light having an optical distribution of a planar light source. At the lower surface of the light guiding plate 135, there are formed reflection dots (not shown). The reflection dots allow the incident light to be reflected and scattered with a high reflectivity.

The planar light which is reflected by the lower surface of the light guiding plate 135 and has the optical distribution of the planar light source is a white light in which P wave 141 and S wave 142 are mixed and outputted toward an upper surface of the light guiding plate 135.

Although the outputted light 141a, 142a passing through the light guiding plate 135 has the optical distribution of the planar light source, brightness uniformity and visual angle characteristics are not optimal. Therefore, if the outputted light 141a, 142a is directly used for display purposes without being processed further, display performance would be greatly lowered.

For enhancing the brightness uniformity and visual angle characteristics while avoiding the above problems, a diffusion plate 134 and a prism sheet 133 are sequentially placed on the light guiding plate 135.

More specifically, the diffusion plate 134 scatters the light 141a, 142a with a low uniformity in the brightness to thereby change the light 141a, 142a into the lights 141b and 142b with a high uniformity in the brightness.

A reflection plate 138 is disposed below the light guiding plate 135. The reflection plate 138 receives a light leaked through the lower surface of the light guiding plate 135 without being reflected toward the diffusion plate 134 and reflects the leaked light toward the diffusion plate 134, thereby enhancing the brightness.

Thus, the lights 141b, 142b that have passed through the light guiding plate 135 and the diffusion plate 134 from the lamp 137 have an optical distribution of the planar is light source with a high uniformity in the brightness. However, the lights 141b, 142b have a narrow front visual angle since the directionality of the lights 141b, 142b is degraded while the lights 141a, 142a transmitted from the light guiding plate 135 is scattered by the diffusion plate 134 to be changed into the lights 141b, 142b.

To overcome this problem, the prism sheet 133 is disposed on the diffusion plate 134. The prism sheet 133 includes at least one sheet. The prism sheet 133 functions to correct the advancing direction of the lights 141b, 142b to thereby enhance the visual angle.

The lights 141c, 142c with an enhanced optical uniformity obtained by passing through the light guiding plate 135, the diffusion plate 134 and the prism sheet 133 are transmitted into an LCD panel for performing a display by precisely controlling the liquid crystal.

Such an LCD panel includes a TFT substrate 116, a color filter substrate 114, a liquid crystal layer (not shown) sandwiched between the TFT substrate 116 and the color filter substrate 114, an upper polarizing plate 112 attached on an external surface of the color filter substrate 114, and a lower polarizing plate 118 attached on an external surface of the TFT substrate 116.

To realize full color displays, when it is assumed that the LCD has a resolution of 800×600, the TFT substrate 116 has divided regions, that is, unit pixels of 800×600×3 to which electric fields with different voltage levels are applied.

Thus, in order to apply different voltage levels to a plurality of the divided regions, thin film transistors are arranged in a matrix configuration on the TFT substrate 116, the number of the thin film transistor being determined by a desired level of resolution. Transparent electrodes (not shown) are also formed on the unit pixel regions of the TFT substrate 116 to be connected with drain electrodes functioning as output electrodes of the thin film transistors.

The color filter substrate 114 is disposed on the TFT substrate 116.

A common voltage having a predetermined voltage level is applied to the color filter substrate 114, so that an electric field is formed between the color filter substrate 114 and the TFT substrate 116 depending on the intensity of the voltage level applied to the transparent electrode of the TFT substrate 116.

Between the color filter substrate 114 and the TFT substrate 116, there is interposed a very thin liquid crystal layer. The liquid crystal layer does not pass the incident light when an electric field is not formed between the color filter substrate 114 and the TFT substrate 116. The liquid crystal layer passes the incident light when the electric field is formed between the color filter substrate 114 and the TFT substrate 116, thereby performing an image displaying.

On the outer surface of the TFT substrate 116, the lower polarizing plate 118 is disposed and on the outer surface of the color filter substrate 114, the upper polarizing plate 112 is disposed. The upper polarizing plate 112 has a polarizing axis perpendicular to that of the lower polarizing plate 118.

The lower polarizing plate 118, for example, passes S wave 141 and the upper polarizing plate 112, for example, passes P wave 142.

The white light irradiated from the lamp 137 includes S wave 141 and P wave 142. The white light passes sequentially through the light guiding plate 135, the diffusion plate 134, and the prism sheet 133 and then passes sequentially through the lower polarizing plate 118, the TFT substrate 116, the liquid crystal layer, the color filter substrate 114 and the upper polarizing plate 112. Thus, after the white light passes through the upper polarizing plate 112 finally, a user can recognize an image.

However, light utilized at this point has only half or lean original brightness as irradiated from the lamp 137. This is because either P wave 141 or S wave is dissipated.

To overcome this, a reflection polarization film 132 is further provided between the lower polarizing plate 118 and the prism sheet 133.

The reflection polarization film 132 passes the light 141c having the P wave component in the form of the planar light source and the corrected optical uniformity and visual angle without any conversion. On the other hand, the reflection polarization film 132 converts the light 142c having the S wave component in the form of the planar light source into the light 141d having the P wave component in the form of the planar light source. The obtained light 141d also has the corrected optical uniformity and visual angle.

The reflection polarization film 132, however, has drawbacks in that a contamination easily occurs due to foreign particles, scratches, etc., a uniform color is not obtained depending on the visual angle, and a Moire phenomenon occurs due to the prism sheet 133 placed below the reflection polarization film 132.

To prevent these drawbacks, a protection sheet 131 for protecting the reflection polarization film 132 is provided on the reflection polarization film 132. The protection sheet 131 is manufactured by an extension process of polyethylene terephthalate (PET)-based material.

When the protection sheet 131 is manufactured by the extension process of PET-based material, the brightness deviation is very high depending on an angle between the polarizing axis of the reflection polarization film 132 and the polarizing axis of the protection film 131 compared with the protection sheet 31 manufactured by the extrusion process of the conventional polycarbonate-based material, as shown in FIG. 4.

Thus, since the light transmissivity depending on the polarizing axis in the protection sheet 131 manufactured by the extension process varies abruptly, it is required to adjust the angle between the polarizing axis of the reflection polarization film 132 and the polarizing axis of the protection film 131.

Referring to FIG. 4, in a state where the protection sheet 131 is placed between the reflection polarization film 132 and the lower polarizing plate 118, as the protection sheet 131 is rotated gradually, it can be noted that minimum brightness and maximum brightness are periodically repeated depending on the rotation angle of the protection sheet 131.

Figure 1:
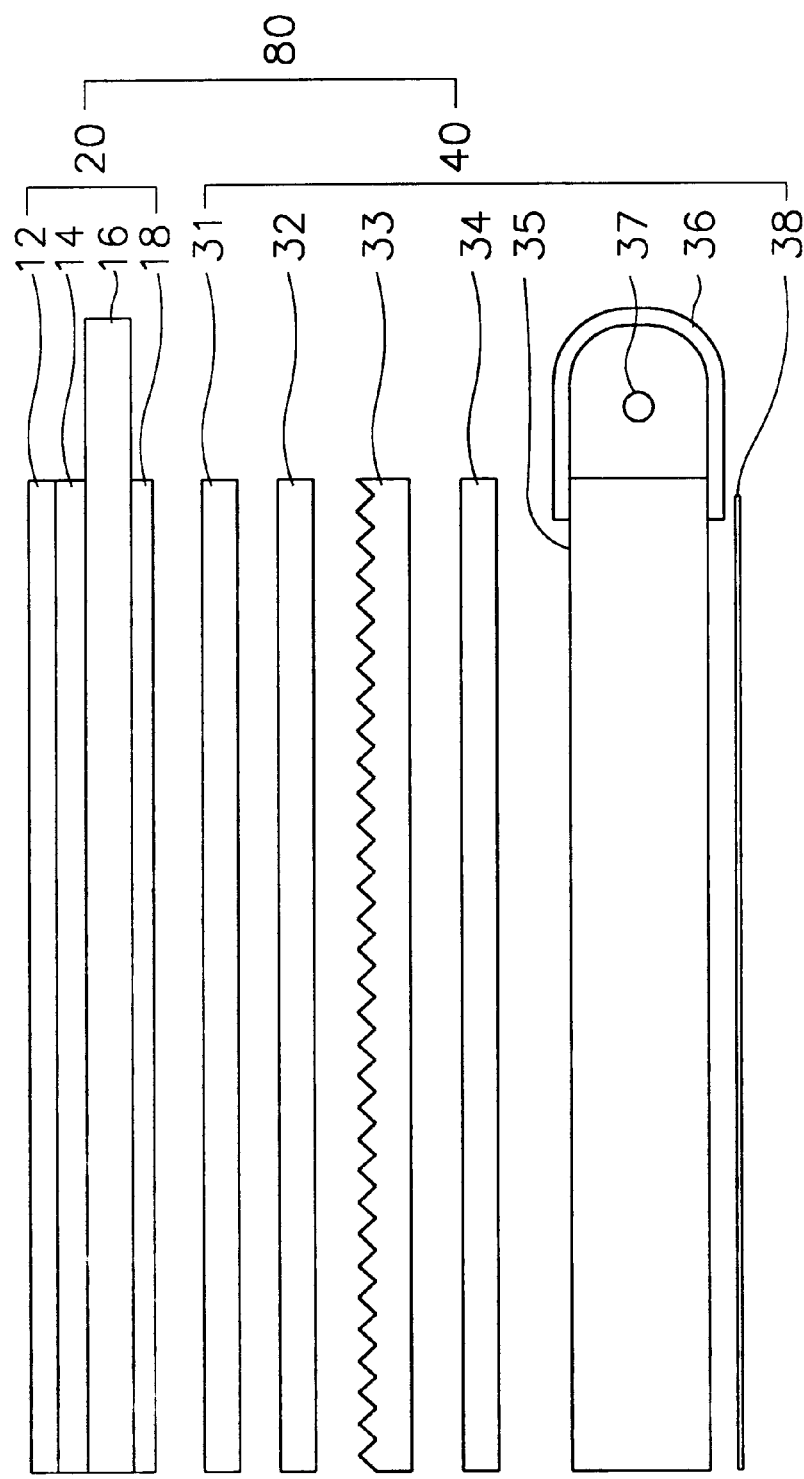
FIG. 1 is a schematic view of a conventional LCD.
Figure 2:
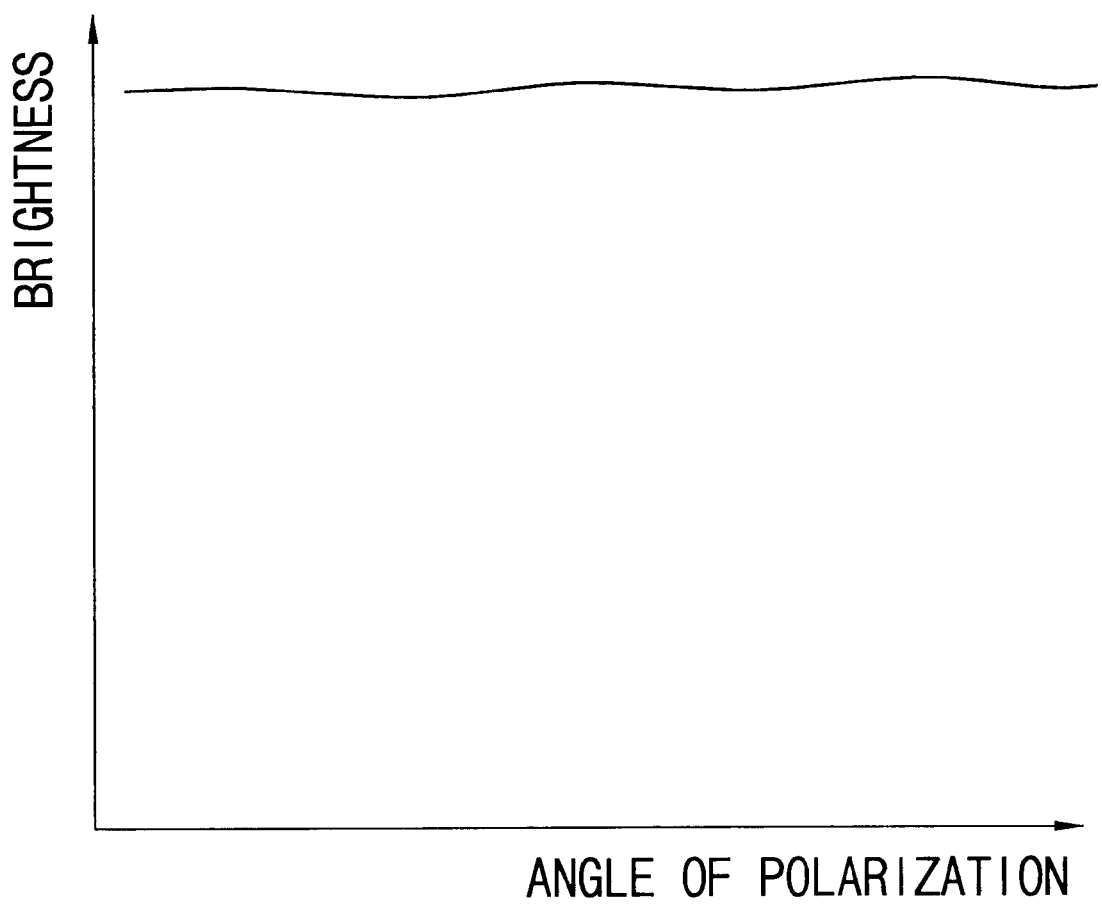
FIG. 2 is a graph showing a relationship between a polarizing axis of the reflection polarization film protection sheet made of polycarbonate based material and a polarizing axis of the reflection polarization film in the LCD of FIG. 1.

The protection sheet 131 manufactured by the extension process of PET-based material guarantees a maximum brightness that is equivalent to a maximum brightness obtained when employing the protection sheet 31 manufactured by the extrusion process of PC-based material shown in FIGS. 1 and 2.

The protection sheet 131 allows passage therethrough of a light to have a maximum brightness as well as a minimum brightness and directs the light toward the TFT substrate 116, depending on the angle between the polarizing axis of the protection sheet 131 and the polarizing axis of the reflection polarization film 132.

Of course, in order to enhance the display characteristic, the light having the maximum brightness should be directed toward the TFT substrate 116. Therefore, an azimuthal angle of the polarizing axis of the protection sheet 131 is selected to transmit a light to have a maximum brightness toward the TFT substrate 116.

In one embodiment, a light with a maximum brightness is transmitted from the protection sheet 131 when the polarizing axis of the protection sheet 131 corresponds to the polarizing axis of the reflection polarization film 132.

Figure 5:
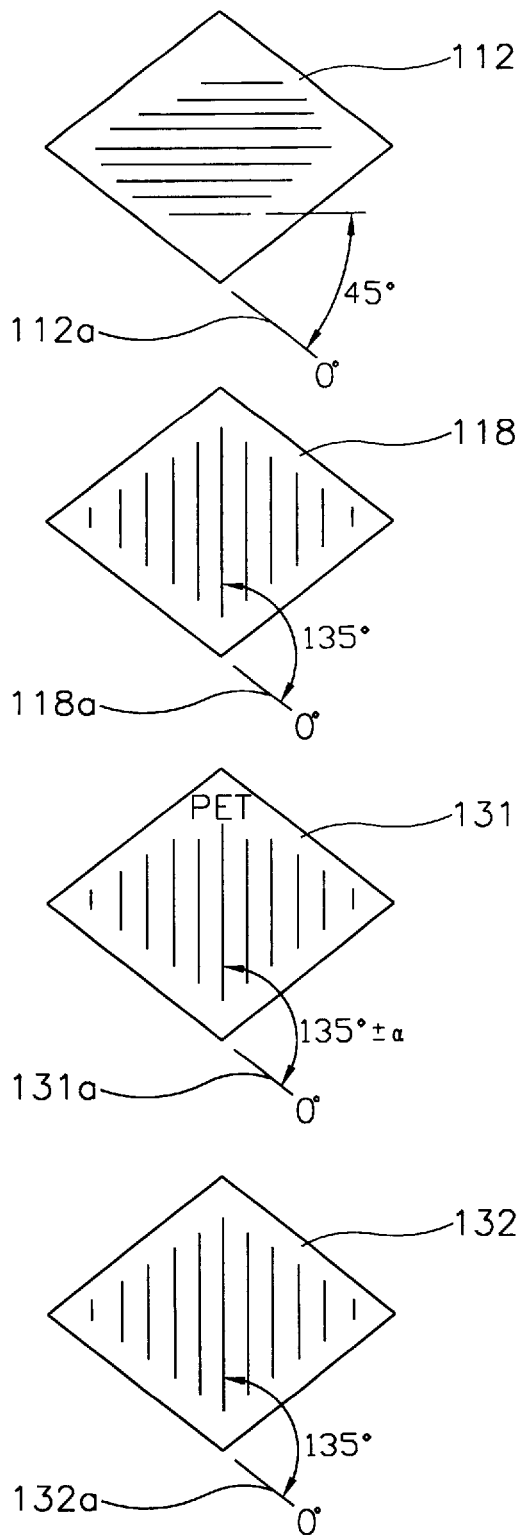
FIG. 5 is a schematic view for describing relationships between the upper polarizing plate, the lower polarizing plate, the reflection polarization film, and the reflection polarization film protection sheet in the LCD as shown in FIG. 3.

With reference to the accompanying drawings of FIGS. 3 through 5, the operation of LCD is more specifically described.

First, when the polarizing axis of the upper polarizing plate 112 is tilted by an angle of 45 degrees from a reference line 112a, the lower polarizing plate 118 is tilted by 90 degrees from the upper polarizing plate 112, so that the lower polarizing plate 118 is tilted by 135 degrees from the reference line 118a.

Under this circumstance, in order to pass the light through the lower polarizing plate 118, the reflection polarization film 132 is tilted by 135 degrees from a reference line 132a in the same manner as the tilting of the lower polarizing plate 118.

In a state where the protection sheet 131 is mounted on the reflection polarization film 132, when the polarizing axis of the protection sheet 131 corresponds to the polarizing axis of the reflection polarization film 132, i.e. when the optical axis of the protection sheet 131 is set with a tilted angle of 135 degrees from a reference line 131a, a maximum brightness can be obtained as indicated in a point "A" in FIG. 4.

As the azimuthal angle becomes larger than 135 degrees from the reference line 131a, the brightness decreases to show a minimum brightness at a point "B" in FIG. 4, and then it again increases to show the maximum brightness at a point "C". Thus, such a procedure is periodically repeated.

For the light transmitted through the protection sheet 131 to have the maximum brightness, it is preferable that the polarizing axis of the reflection polarization film 132 corresponds to the polarizing axis of the protection sheet 131.

Alternatively, the polarizing axis of the protection sheet 131 may not correspond to the polarizing axis of the reflection polarization film 132. The polarizing axis of the protection sheet 131 is controlled to form an angle with the polarizing axis of the reflection polarization film 132 within an allowable range, for example, 10 degrees.

The protection sheet 131 manufactured by the extension of PET-based material provides the brightness equivalent to that obtained from the conventional protection sheet 31 of PC-based material. The protection sheet 31 can also be manufactured at a low cost, and it has a thermal expansion coefficient lower than that of the conventional protection sheet 31 shown in FIG. 2, so that its deformation can be prevented.

Table 1 shows comparison and analysis results between the conventional protection sheet 31 manufactured by the extrusion process of the PC-based material and the protection sheet 131 manufactured by the extension process of the PET-based material in accordance with the present invention.

TABLE 1

| Conventional protection sheet | Items | Protection sheet of the present invention |
|---|---|---|
| Polycarbonate-based | Material | Polyethylene terephthalate |
| $8 \times 10^{-5}$ | Heat expansion coefficient | $24 \times 10^{-5}$ |
| 95% | Maximum brightness | 95% |
| 90% | Minimum brightness | 50% |
| Very high | Price | Low |

Referring to Table 1, the protection sheet 131 has a thermal expansion coefficient much lower than that of the conventional protection sheet 31. Thus, a deformation does not easily occur, so that the display performance of the LCD employing the protection sheet 131 is greatly enhanced.

Also, both of the conventional protection sheet 31 and the protection sheet 131 of the present invention provide an identical maximum brightness of 95% or more. However, the conventional protection sheet 31 has a minimum brightness of 90% while the protection sheet 131 of the present invention has a minimum brightness of approximately 50%.

In addition, in the aspect of manufacturing costs, the conventional protection sheet 31 is very high in price but the protection sheet 131 of the present invention is low in price.

As described above, a protection sheet manufactured by an extension process of PET-based material in accordance with the present invention is disposed on the reflection polarization film used for enhancing the display brightness. The protection sheet of the present invention can be manufactured at a low price. Also, since the protection sheet of the present invention has a relatively low thermal expansion coefficient compared with the conventional protection sheet, deformation of the protection sheet is prevented, color variation depending on variation of the visual angle is minimized, etc.

While the present invention has been described in detail, it should be understood that various changes, substitutions and alterations can be made hereto without departing from the spirit and scope of the invention as defined by the appended claims.

What is claimed is:

1. A method of illuminating a liquid crystal layer, the method comprising:
   generating a light including a first light passing through a first polarizing axis and a second light passing through a second polarizing axis;
   changing a polarization of the second light such that the second light passes through the first polarizing axis;
   passing the first light and the changed second light through a third polarizing axis, the third polarizing axis allowing a brightness pattern repeated in a range of a first value and a second value depending on an angle between the third polarizing axis and the first polarizing axis, the first value being greater than the second value;
   controlling the angle between the third polarizing axis and the first polarizing axis such that the first light and the changed second light are transmitted as a third light having a brightness of a desired value equal to or greater than the second value and equal to or less than the first value; and
   providing the third light to a liquid crystal layer.

2. The method of claim 1, wherein the angle is within about 10 degrees.

3. The method of claim 1, wherein the desired value is the first value.

4. The method of claim 1, wherein the third polarizing axis corresponds to the first polarizing axis.

5. The method of claim 1, wherein the third polarizing axis is formed by a polyethylene terephthalate-based material.

6. The method of claim 5, wherein the polyethylene terephthalate-based material is manufactured by an extension process.

7. The method of claim 1, further comprising changing an optical property of the first and second light.

8. The method of claim 7, wherein the changing the optical property of the first and second light comprises changing the light to have an optical distribution of a planar light.

9. The method of claim 7, wherein the changing the optical property of the first and second light comprises changing the light to have a uniform brightness distribution.

10. The method of claim 9, wherein the changing the optical property of the first and second light comprises scattering the light to enhance brightness and concentrating the scattered light.

11. The method of claim 6, wherein the changing the optical property of the first and second light comprises increasing visual angle characteristics.

12. A liquid crystal display comprising:
   a light source for generating a light including a first light passing through a first polarizing axis and a second light passing through a second polarizing axis;
   a reflection polarization film having the first polarizing axis through which the first light passes and for changing a polarization of the second light such that the changed second light passes the reflection polarization film;

a protection sheet disposed on the reflection polarization film, the protection sheet having a third polarizing axis, and passing therethrough the first light and the changed second light to have a brightness pattern repeated in a range of a first value to a second value depending on an angle between the third polarizing axis and the first polarizing axis, the first value being greater than the second value, and the angle being adjusted such that the first light and the changed second light are transmitted as a third light having a brightness of a desired value equal to or greater than the second value and equal to or less than the first value; and an LCD panel for receiving the third light to display an image.

13. The liquid crystal display of claim 12, wherein the third polarizing axis corresponds to the first polarizing axis.

14. The liquid crystal display of claim 12, wherein the angle is within about 10 degrees.

15. The liquid crystal display of claim 12, wherein the desired value is the first value.

16. The liquid crystal display of claim 12, wherein the protection sheet is made of a polyethylene terephthalate based material.

17. The liquid crystal display of claim 16, wherein the polyethylene terephthalate based material is manufactured by an extension process.

18. The liquid crystal display of claim 12, further comprising an optical distribution changing means for changing an optical property of the first and the second light.

19. The liquid crystal display of claim 12, wherein the LCD panel comprises:

a TFT substrate having a first electrode arranged in a matrix configuration;

a color filter substrate facing the TFT substrate and having a second electrode formed on the whole area of the color filter substrate;

a liquid crystal sandwiched between the TFT substrate and the color filter substrate;

a lower polarizing plate disposed below the TFT substrate and having a polarizing axis corresponding to the first polarizing axis of the reflection polarization film; and an upper polarizing plate disposed on the color filter substrate and having a polarizing axis perpendicular to the polarizing axis of the lower polarizing plate.

* * * * *